US009154677B2

(12) United States Patent
Merz

(10) Patent No.: US 9,154,677 B2
(45) Date of Patent: Oct. 6, 2015

(54) CAMERA ACCESSORY FOR ANGLED CAMERA VIEWING

(71) Applicant: Nicholas G. L. Merz, San Francisco, CA (US)

(72) Inventor: Nicholas G. L. Merz, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 281 days.

(21) Appl. No.: 13/623,299

(22) Filed: Sep. 20, 2012

(65) Prior Publication Data

US 2014/0078389 A1  Mar. 20, 2014

(51) Int. Cl.
H04N 5/225 (2006.01)
G03B 17/17 (2006.01)
G03B 17/56 (2006.01)

(52) U.S. Cl.
CPC .............. H04N 5/2254 (2013.01); G03B 17/17 (2013.01); G03B 17/565 (2013.01); H04N 5/2252 (2013.01)

(58) Field of Classification Search
CPC .. H04N 5/2251; H04N 5/2252; H04N 5/2254
USPC .......................... 348/343–344, 373, 375–376
See application file for complete search history.

(56) References Cited

U.S. PATENT DOCUMENTS 5,469,236 A * 11/1995 Roessel ..................... 396/432
7,030,926 B2  4/2006 Miyake et al.
7,967,513 B2 * 6/2011 Zhang ........................ 396/351
8,279,544 B1 * 10/2012 O'Neill ...................... 359/827
2005/0036044 A1 * 2/2005 Funakura .................... 348/239
2005/0054377 A1  3/2005 Yeh
2006/0215013 A1  9/2006 Jongsma et al.
2007/0120960 A1 * 5/2007 Chang ...................... 348/14.02
2009/0196597 A1 * 8/2009 Messinger et al. ........... 396/427
2010/0225429 A1 * 9/2010 Tsai ........................ 335/219
2010/0237222 A1 * 9/2010 Lin .......................... 248/683
2010/0328420 A1  12/2010 Roman
2011/0081946 A1  4/2011 Singh
2012/0026298 A1 * 2/2012 Filo et al. .................... 348/49
2012/0069169 A1 * 3/2012 Dejima ....................... 348/77
2013/0002939 A1 * 1/2013 O'Neill ....................... 348/360

FOREIGN PATENT DOCUMENTS

WO  2011098760  8/2011

* cited by examiner

Primary Examiner — Kelly L Jerabek
(74) Attorney, Agent, or Firm — Treyz Law Group; G. Victor Treyz; Joseph F. Guihan

(57) ABSTRACT

An electronic device may have front and rear surfaces. A front-facing camera may be formed on the front surface and a rear-facing camera may be formed on the rear surface. A display may be mounted on the front face of the electronic device. The cameras may nominally point along axes that run parallel to surface normals for the front and rear surfaces. A removable camera accessory with reflector structures may be mounted over a camera to deflect light and thereby point the camera in an off-axis direction. The removable camera accessory may be supported in a stand or other support structure. Magnetic structures and other structures may be used in coupling the electronic device to the support structures and may be used in coupling the camera accessory to the electronic device.

10 Claims, 25 Drawing Sheets

CAMERA ACCESSORY FOR ANGLED CAMERA VIEWING

BACKGROUND

This relates generally to electronic devices, and more particularly, to electronic devices with cameras and displays.

Electronic devices often include cameras and displays. For example, a cellular telephone or tablet computer may have a touch screen display with which a user may view content and provide touch input. Front-facing and rear-facing cameras may be used to capture still and moving digital image data.

In a typical electronic device layout, displays are mounted in a planar housing having front and rear surfaces. A front-facing camera may be mounted adjacent to a display on the front surface of a device. A rear-facing camera may be mounted on the rear surface of the device. With this type of layout, the direction of view of the cameras is fixed. The front facing camera points along an axis that is oriented in a direction that is perpendicular to the display and the front face of the device. The rear facing camera points in the opposite direction, perpendicular to the plane of the rear surface of the device.

It can be challenging to use devices with this type of conventional layout. Cameras are often not pointed where desired, so use of the cameras can be awkward or impractical for certain applications. Because the direction of view of the cameras is not always as desired, it can be difficult to display satisfactory camera content on the display of a device.

It would therefore be desirable to be able to provide improved camera and display systems for electronic devices.

SUMMARY

An electronic device may have front and rear surfaces. A front-facing camera may be formed on the front surface and a rear-facing camera may be formed on the rear surface. A display may be mounted on the front face of the electronic device.

The front-facing camera may nominally point along an axis that runs parallel to the surface normal for the front surface of the electronic device. The rear-facing camera may nominally point along an axis that runs parallel to the surface normal for the rear surface of the electronic device.

A camera accessory such as a removable camera accessory with reflector structures may be mounted over one or more of the cameras. When mounted over a camera, the camera accessory may deflect light and thereby point the camera (i.e., the camera's field of view) in an off-axis direction.

The removable camera accessory may be supported in a stand or other support structure. Magnetic structures and other structures may be used in coupling the electronic device to the support structures and may be used in coupling the camera accessory to the electronic device. The camera accessory may, for example, be coupled to the electronic device using a suction cup, using removable (reusable) adhesive, using a clamp structure, or using other attachment mechanisms. The camera accessory may contain reflector structures that deflect light for the front-facing and/or the rear-facing camera.

The camera accessory may be provided with rotational detents that allow the camera accessory to be placed in a desired rotational orientation relative to the electronic device. Magnetic structures may also be configured to allow adjustment of the rotational orientation of the camera accessory. A camera accessory may have an elongated shaft formed from a fiber bundle. The fiber bundle may have a first end that overlaps the camera in an electronic device and an associated light source and a second end in the vicinity of an object to be imaged.

A stand or other support structures may be coupled to the electronic device. The support structures may include magnetic structures, a rotatable joint, and other structures for holding and positioning the electronic device and its cameras in a desired location. A counterweight may be used to balance the electronic device relative to the joint.

Control circuitry within the electronic device may capture image data from both the front-facing and rear-facing cameras simultaneously. Camera accessory structures may deflect light associated with one or both of the cameras during image acquisition. The control circuitry may simultaneously display image content from both of the cameras on the same display screen using a split-screen format or other format that accommodates the display of multiple images.

The camera accessory may be configured to facilitate the capture of three-dimensional image data using a single camera with a split field of view or using multiple cameras that are simultaneously coupled to the camera accessory.

Further features of the invention, its nature and various advantages will be more apparent from the accompanying drawings and the following detailed description of the preferred embodiments.

DETAILED DESCRIPTION

Electronic devices may include displays and cameras and may be provided with camera accessories to enhance camera capabilities. Cameras can acquire digital image data. The displays may be used to display still and moving images to a user. For example, the displays may be used to display content to users that has been acquired using the cameras and camera accessories. Camera accessories may be provided with optical structures such as reflectors and lenses that modify the direction of view of a camera. Systems that incorporate one or more camera accessories may be used to provide viewers with camera images that might otherwise be difficult or impossible to obtain. Illustrative electronic devices that may be provided with displays and cameras and that may be used in systems with camera accessories are shown in FIGS. 1 and 2.

Figure 1:
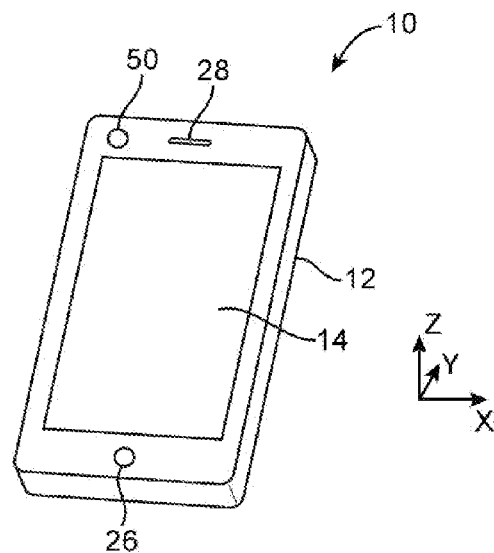
FIG. 1 is a perspective view of an illustrative electronic device such as a handheld electronic device with a display and camera in accordance with an embodiment of the present invention.

FIG. 1 shows how electronic device 10 may be a handheld device such as a cellular telephone, music player, gaming device, navigation unit, or other compact device. In this type of configuration for device 10, housing 12 may have opposing front and rear surfaces. Display 14 and camera 50 may be mounted on a front face of housing 12. A camera such as camera 50 may also be mounted on an opposing rear face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 1).

Figure 2:
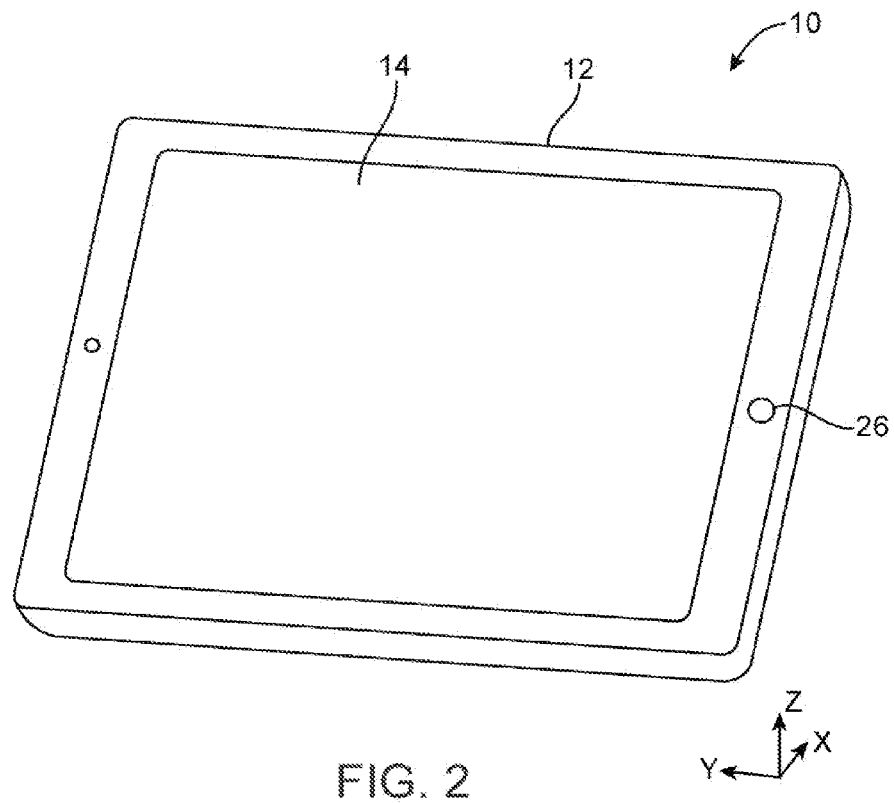
FIG. 2 is a perspective view of an illustrative electronic device such as a tablet computer with a display and camera in accordance with an embodiment of the present invention.

FIG. 2 shows how electronic device 10 may be a tablet computer. In electronic device 10 of FIG. 2, housing 12 has opposing planar front and rear surfaces. Display 14 and camera 50 may be mounted on the front surface of housing 12. Device 10 may also be provided with a rear-facing camera on the rear surface of housing 12. As shown in FIG. 2, display 14 may have a cover layer or other external layer with an opening to accommodate button 26 (as an example).

The illustrative configurations for device 10 that are shown in FIGS. 1 and 2 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Electronic devices such as device 10 of FIGS. 1 and 2 and other electronic devices may be provided with a housing such as housing 12 of FIGS. 1 and 2. Housing 12, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Electronic device 10 may be provided with one or more displays such as displays 14 of FIGS. 1 and 2. Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components. Display 14 may include display pixels formed from light-emitting diodes (LEDs), organic LEDs (OLEDs), plasma cells, electrowetting pixels, electrophoretic pixels, liquid crystal display (LCD) components, or other suitable display pixel structures. A display cover layer or other outer display layer may cover the surface of display 14. The display cover layer or other outer display layer may be formed from a transparent glass sheet, a clear plastic layer, or other transparent member.

Figure 3:
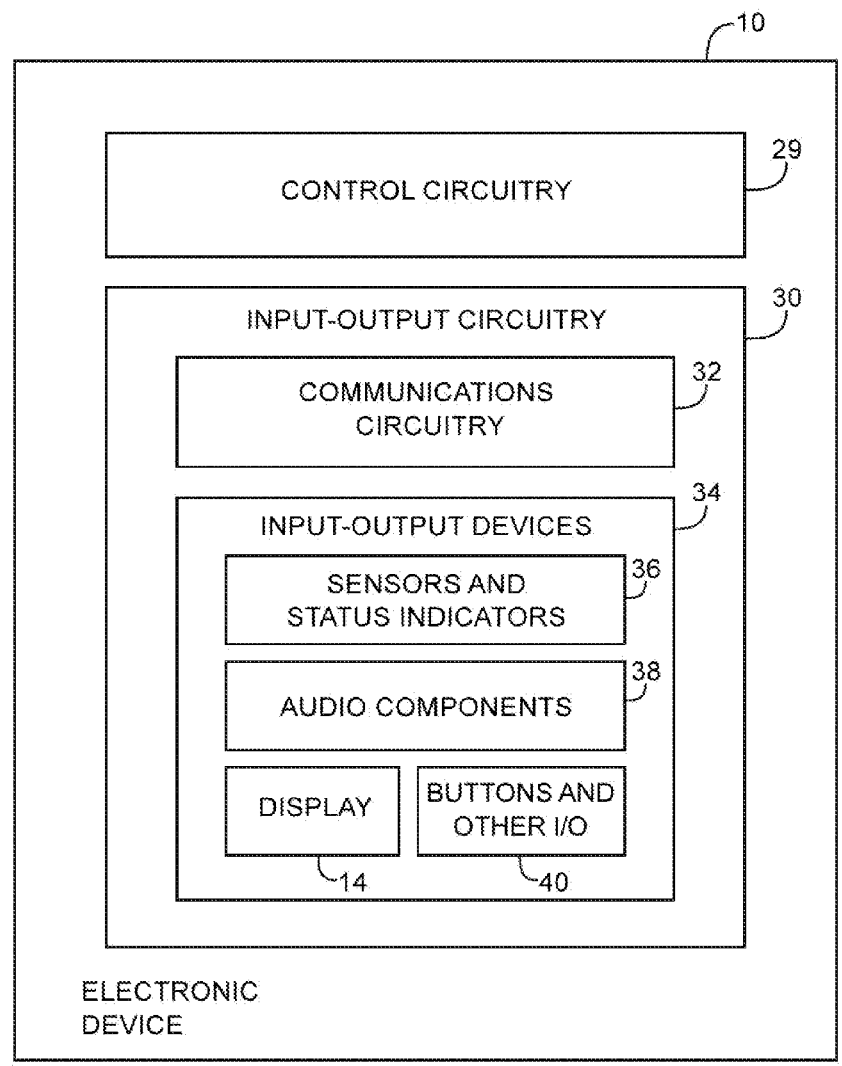
FIG. 3 is a schematic diagram of an illustrative electronic device with a display and camera in accordance with an embodiment of the present invention.

A schematic diagram of an illustrative configuration that may be used for electronic device 10 is shown in FIG. 3. As shown in FIG. 3, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. For example, control circuitry 29 may display camera content and other content on display 14, may process digital image data to generate three-dimensional images, split-screen images, and other content.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 4:
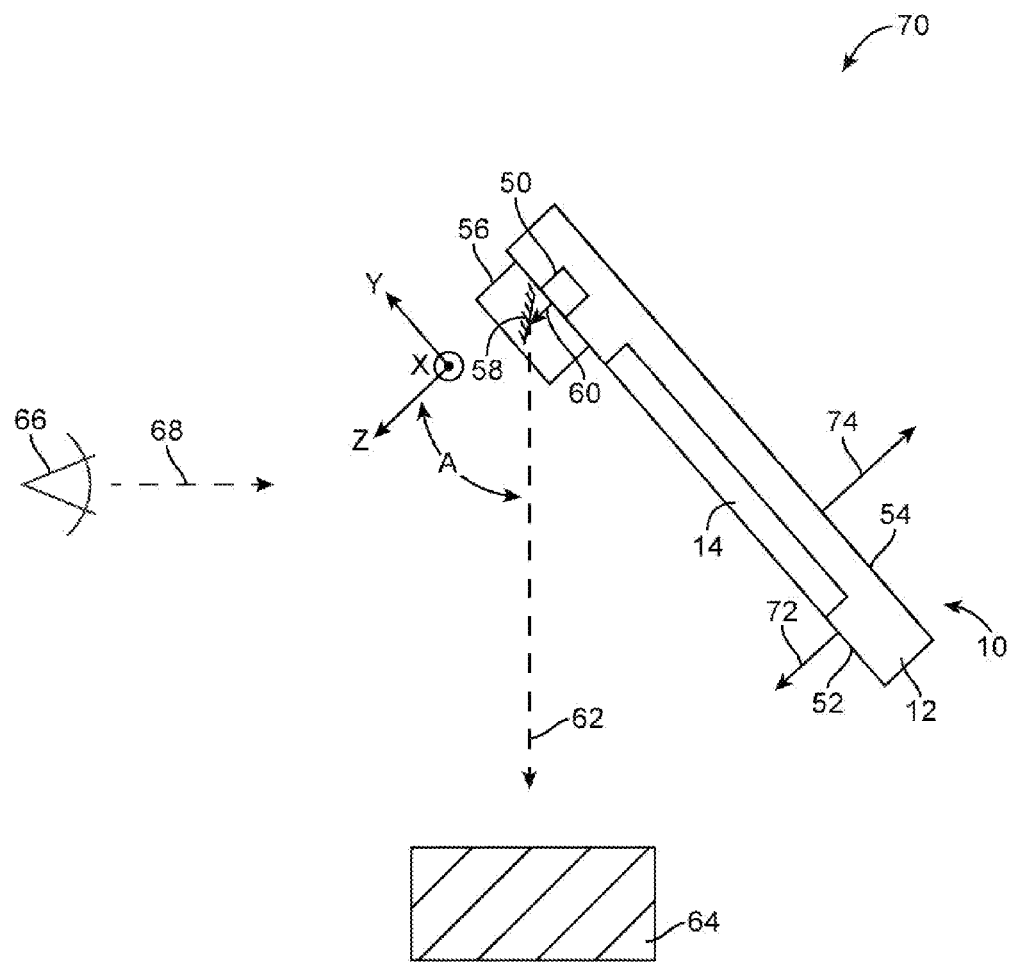
FIG. 4 is a side view of an illustrative system for using an electronic device and display in accordance with an embodiment of the present invention.

FIG. 4 is a diagram of a system in which an electronic device has been provided with a camera accessory to redirect the direction in which a camera in the electronic device is pointed from its normal on-axis direction (i.e., to alter the direction of view of the camera to an off-axis direction and to optionally the field of view of the camera). As shown in FIG. 4, device 10 in system 70 may have a housing with front and rear surfaces such as planar front surface 52 and opposing planar rear surface 54. Display 14 may be mounted on front surface 52. Support structures (not shown in FIG. 4) may be used to maintain device 10 in an orientation that allows a viewer such as viewer 66 that is observing device 10 in direction 68 to view content on display 14.

Planar front and rear surfaces 52 of device 10 may each be characterized by a surface normal. For example, front face 52 may be characterized by surface normal 72 and rear face 54 may be characterized by surface normal 74. A surface normal is a vector that is perpendicular to an associated plane. For example, surface normal 72 is perpendicular to the plane of front face 52 and surface normal 54 is perpendicular to the plane of rear face 54. Because housing 12 has a flat shape, surface normals 72 and 74 are both perpendicular to the plane in which housing 12 lies.

Cameras such as camera 50 of FIG. 4 may be mounted within housing 12 of device 10 so that they are pointed directly outward, along an axis that is parallel to the surface normal of the housing surface in which they are mounted. For example, device 10 may have a rear-facing camera with lenses and an image sensor that are pointed directly outward from rear surface 54, parallel to surface normal 74. As shown in FIG. 4, front-facing camera 50 of device 10 may have image sensor and lens structures that are configured so that camera 50 points directly outward from surface 52 in direction 60, parallel to surface normal 72 (i.e., parallel to axis Z in the coordinate system of FIG. 4).

Cameras that point directly outwards from device 10 in this way may not capture images from a desired location. Challenges may arise, for example, when it is desired to capture images of subjects located in the position of object 64 with camera 50.

To ensure that content such as object 64 of FIG. 4 can be captured using camera 50, electronic device 10 may be provided with a camera accessory such as camera accessory 56. Camera accessory 56 may include a reflector such as reflector 58. Reflector 58 may be formed from reflective optical structures such as one or more mirrors and/or one or more prisms that reflect light for camera 50. As shown in FIG. 4, reflective structures such as reflector 56 may be configured to redirect the field of view of camera 50 so that camera 50 is no longer pointing in direction 60. The direction in which camera 50 is pointed by camera accessory 56 may be selected to ensure that camera 50 can capture images of interest. In the example of FIG. 4, reflector 58 of camera accessory 56 has been oriented so that camera 50 is pointing in direction 62 towards object 64, rather than original direction 60.

By using camera accessory 56 to change the direction in which camera 50 is pointing, camera accessory 56 may allow viewer 66 to view content such as object 64 that is of interest for viewing on display 14. As an example, camera 50 can capture images of the hands of a worker that are located at the position of object 64. Viewer 66 (e.g., the worker or another person) may view the images of the worker's hands or other content captured by camera 50 on display 14 in real time.

The structures of camera accessory 56 may, if desired, be formed as an integral portion of device 10. To allow for the occasional possibility of using device 10 in a configuration in which camera 50 reverts to pointing in its nominal on-axis direction, it may be desirable to provide camera accessory 56 as a removable (temporary) structure. Configurations in which camera accessory 56 is a separate removable structure are therefore sometimes described herein as an example.

Reflector 58 may be oriented so that camera 50 is pointed in a direction (i.e., direction 62 of FIG. 4) that is oriented at an angle A with respect to surface normal 72 and axis Z. Angle A may be, for example, an angle with a value of 0-90°, an angle with a value of 5-70°, and angle with a value of 25-60°, or an angle with a value of 35-55° (as examples).

Figure 5:
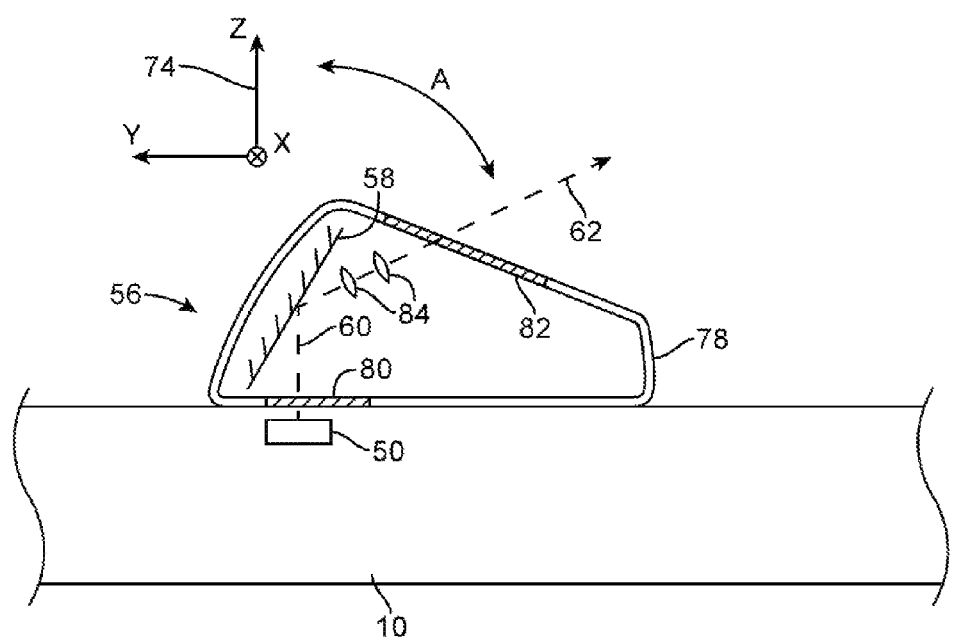
FIG. 5 is a cross-sectional side view of an illustrative electronic device that has been provided with a camera accessory that can point a camera in the electronic device in an off-axis direction in accordance with an embodiment of the present invention.
Figure 6:
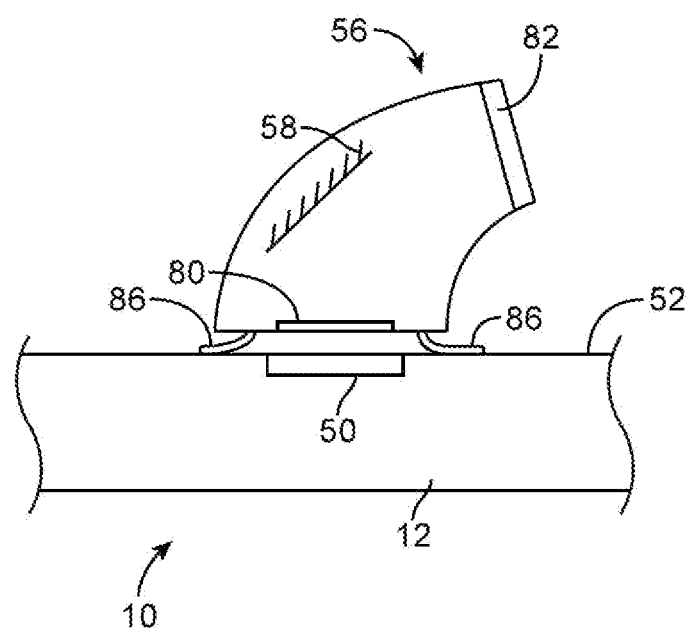
FIG. 6 is a cross-sectional side view of an illustrative camera accessory that has been mounted over a camera in an electronic device using a suction cup arrangement in accordance with an embodiment of the present invention.

A cross-sectional side view of device 10 in the vicinity of camera accessory 56 is shown in FIG. 5. As shown in FIG. 6, camera accessory 56 may be mounted on top of camera 50. Camera accessory 56 may have a housing such as housing 78. Transparent windows such as windows 80 and 82 may be formed in housing 78 to allow light from external objects to reach camera 50. Optional lenses such as lenses 84 may be included in camera accessory 56 to modify the field of view of camera 50. Reflector 58 may be configured so that accessory 56 points camera 50 in a direction such as direction 62 that is oriented at an angle A with respect to surface normal 74 (the Z-axis of FIG. 5).

Housing 78 of camera accessory 56 may be formed from metal, plastic, glass, ceramic, other materials, and combinations of these materials. Transparent window structures such as windows 80 and 82 may be formed from clear plastic, transparent glass, or other clear materials. When camera assembly 56 is installed on device 10, window 80 is preferably aligned with camera 50 (i.e., window 80 overlaps camera 50).

Camera accessory 56 may be provided with structures that facilitate removable mounting on device 10. As an example, camera accessory 56 may be provided with a suction cup structure or other elastomeric structure for attaching camera accessory 56 to device 10 such as elastomeric attachment structure 86 of FIG. 6.

Figure 7:
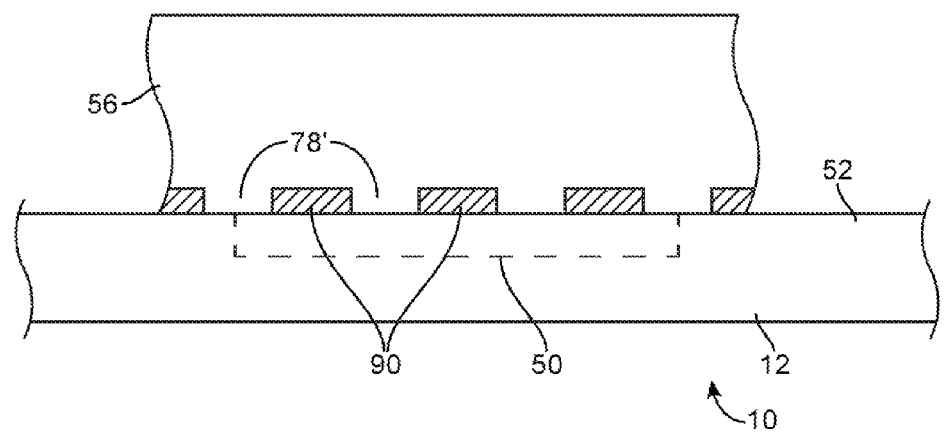
FIG. 7 is a cross-sectional side view of an illustrative camera accessory that has been mounted over a camera in an electronic device using removable adhesive in accordance with an embodiment of the present invention.

FIG. 7 shows how camera accessory 56 may be provided with a housing having protrusions such as protrusions 78'. Removable (reusable) adhesive 90 may be provided in recesses between adjacent protrusions 78'. Adhesive 90 may be used to attach camera accessory 56 to surface 52 of housing 12 in device 10 in alignment with camera 50. Protrusions 78' may serve as stops that help define the position of camera accessory 56 with respect to surface 52.

Figure 8:
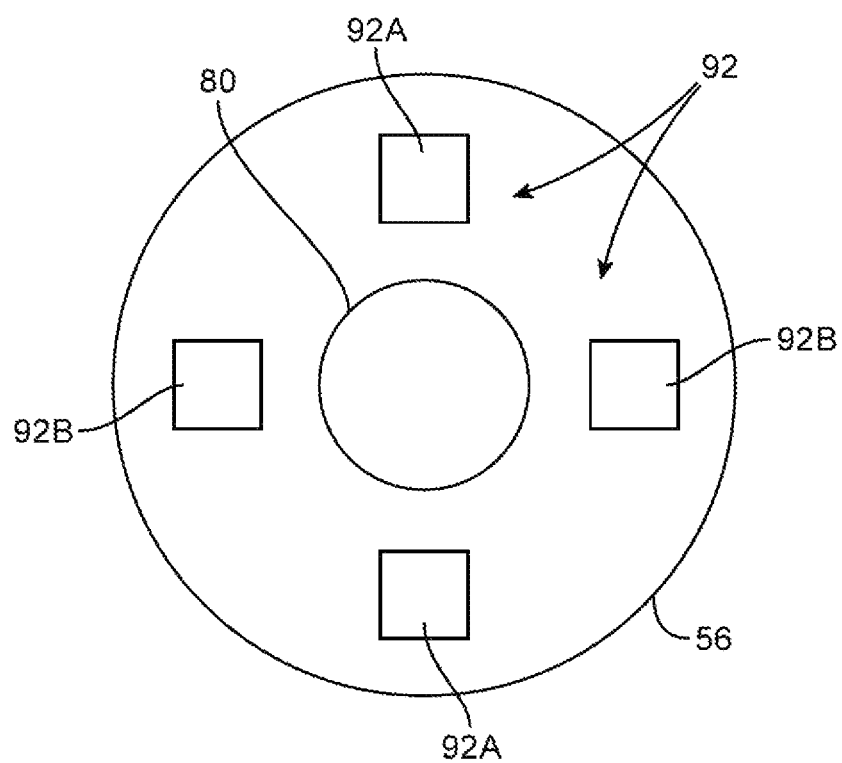
FIG. 8 is a bottom view of a camera accessory having magnets for mounting the camera accessory to an electronic device over a camera in the electronic device in accordance with an embodiment of the present invention.

If desired, magnetic structures (ferromagnetic materials and/or magnets) may be used in coupling camera accessory 56 to device 10. FIG. 8 is a bottom view of an illustrative camera accessory showing how the accessory may be provided with magnetic structures. As shown in FIG. 8, camera accessory 56 may, as an example, be provided with four magnets or other magnetic structures 92. Magnetic structures 92 in the configuration of FIG. 8 have been arranged in two pairs, corresponding to two possible (perpendicular) angular orientations for camera accessory 56 with respect to device 10. The first pair of structures (structures 92A) and the second pair of structures (structures 92B) are oriented at right angles with respect to each other.

Figure 9:
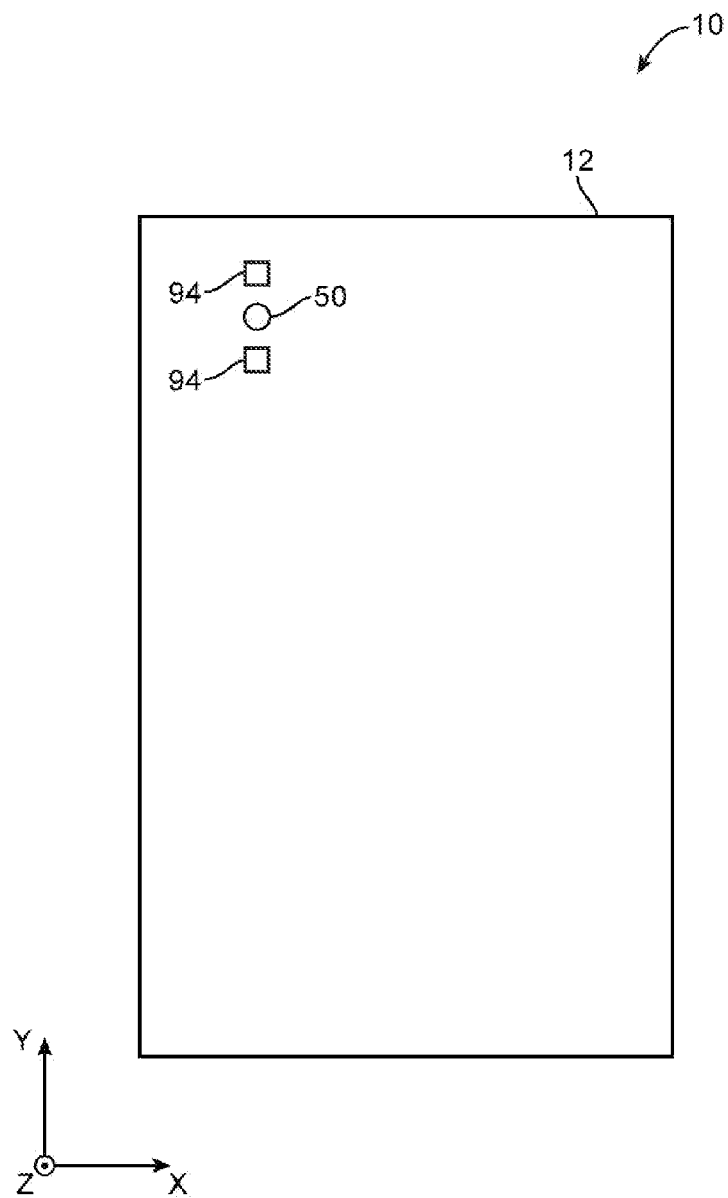
FIG. 9 is a top view of an illustrative electronic device having magnets located adjacent to a camera to facilitate rotational orientation adjustment and removable attachment of a camera accessory in accordance with an embodiment of the present invention.

FIG. 9 shows how device 10 may be provided with a mating pair of magnetic structures 94 (e.g., magnets and/or ferromagnetic members). In the example of FIG. 9, magnetic structures 94 include a first structure that is located below camera 50 (in dimension Y) and a second structure that is located above camera 50 (in dimension Y). Camera accessory 56 of FIG. 8 may be mounted over camera 50 in either a first orientation in which magnetic structures 92A are magnetically coupled to magnetic structures 94 or a second orientation in which magnetic structures 92B are magnetically coupled to magnetic structures 94. In the first orientation, camera accessory 56 will have a first rotational orientation with respect to housing 12 in the X-Y plane. In the second orientation, camera accessory 56 will have a second rotational orientation that is perpendicular to the first rotational orientation. If desired, one or more, two or more, or three or more pairs of magnetic structures may be provided on camera accessory 56 and device 10 may have one or more, two or more, or three or more pairs of mating magnetic structures 94 (e.g., to allow one or more, two or more, or three or more angular orientations between camera accessory 56 and device 10).

Figure 10:
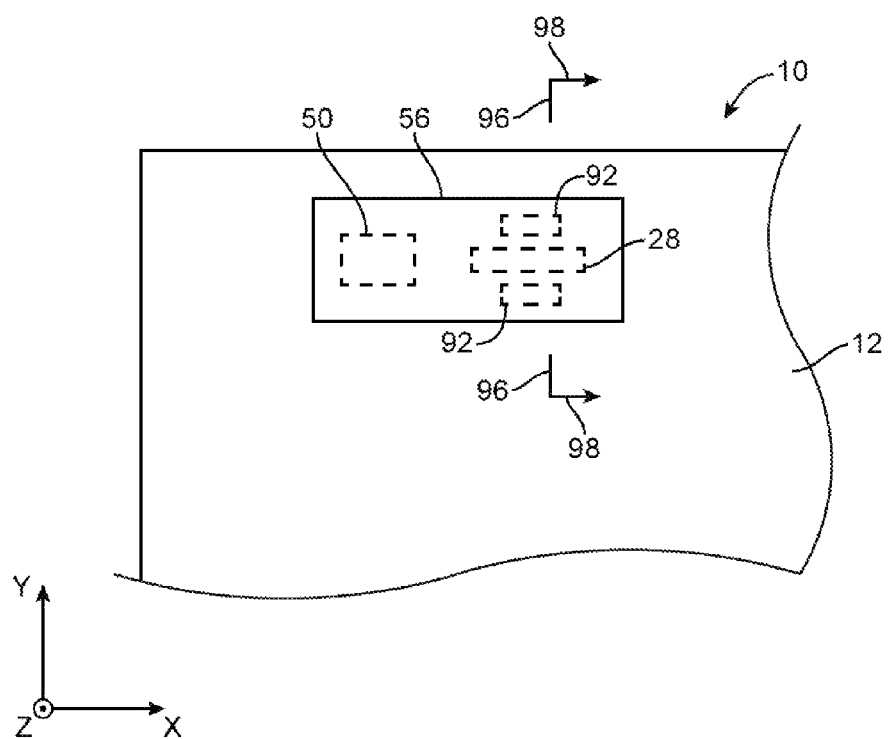
FIG. 10 is a top view of an illustrative camera accessory that has been mounted over a camera in an electronic device by magnetically attaching the accessory to magnetic structures associated with a speaker in accordance with an embodiment of the present invention.
Figure 11:
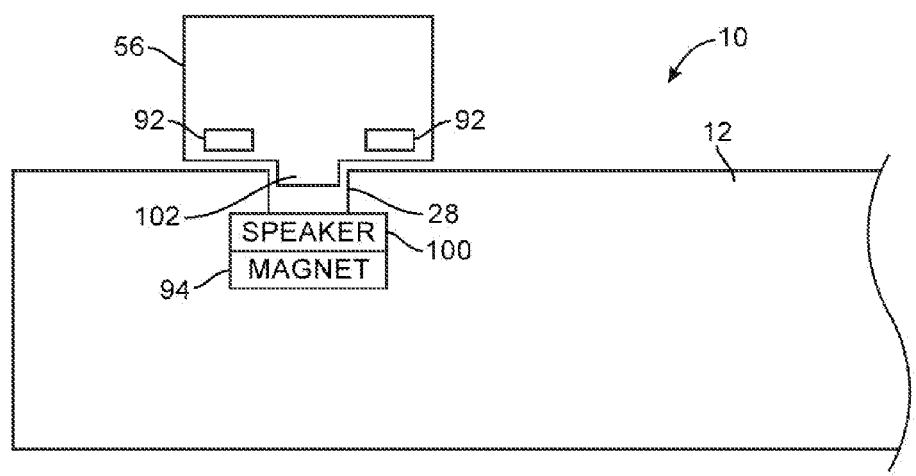
FIG. 11 is a cross-sectional side view of an illustrative camera accessory mounted to an electronic device using a configuration of the type shown in FIG. 10 in accordance with an embodiment of the present invention.

Magnetic structures 92 may be magnetically coupled to magnetic structures in device 10 such as magnetic structures associated with a speaker. As shown in FIG. 10, for example, camera accessory 56 may have a left-hand portion that overlaps camera 50 and a right-hand portion containing magnetic structures 92 that are configured to couple magnetically with a magnet associated with speaker port 28. A cross-sectional side view of camera accessory 56 and device 10 of FIG. 10 taken along line 96 and viewed in direction 98 is shown in FIG. 11. As shown in FIG. 11, camera accessory 56 may have a portion such as protrusion 102 that is configured to be received within the opening in housing 12 of device 10 that is associated with speaker port 28.

Speaker port 28 may have an associated speaker such as speaker 100 and speaker magnet 94. Speaker magnet 94 may be magnetically coupled to magnetic structures 92 in camera accessory 56, thereby holding camera accessory 56 in place on device 10. The presence of protrusion 102 may help secure camera accessory 56 (e.g., by serving as a registration feature that helps locate camera accessory 56 on device 10).

Figure 12:
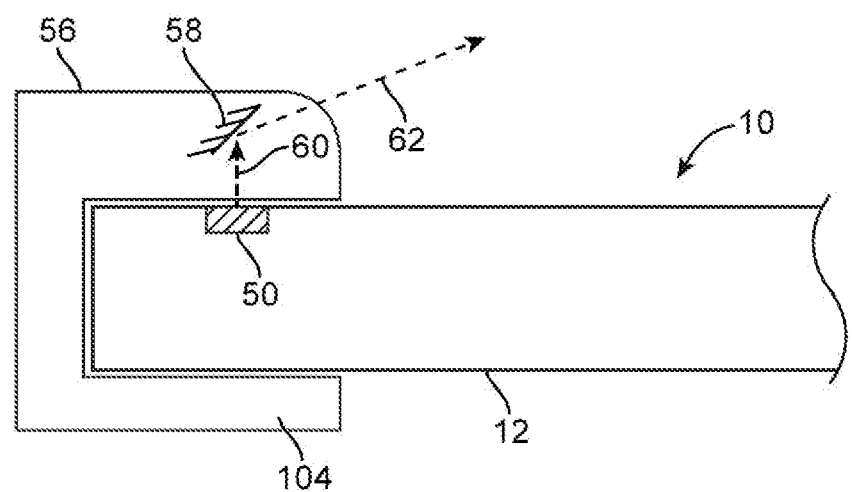
FIG. 12 is a cross-sectional side view of an illustrative camera accessory that has been mounted over a camera in an electronic device using mechanical attachment structures such as clamp structures in accordance with an embodiment of the present invention.

FIG. 12 shows how camera accessory 56 may be provided with mechanical attachment structures such as clamp structures 104 to help secure camera accessory 56 to device 10. Mechanical attachment structures may form a snug fit between camera accessory 56 and the exterior of housing 12 or may include a screw, lever, or other structure for selectively applying pressure to device 10 to attach camera accessory 56 to device 10.

Figure 13:
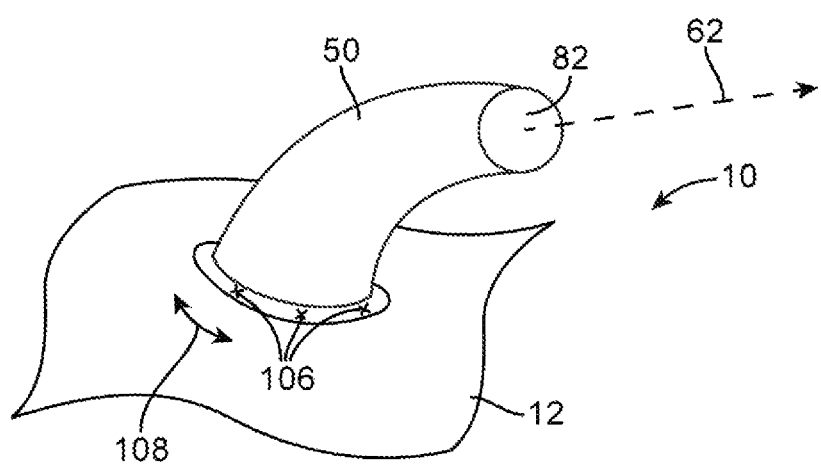
FIG. 13 is a perspective view of an illustrative camera accessory with rotational detents that has been mounted over a camera in an electronic device in accordance with an embodiment of the present invention.

As shown in FIG. 13, camera accessory 56 may be configured to rotate about a rotational axis in directions 108. To assist a user of device 10 in placing camera accessory 56 in a desired angular orientation, camera accessory 56 may be provided with detent structures such as detents 106. Detents 106 may create a clicking noise and periodic physical resistance, so as to provide a user with feedback on the location of camera accessory 56. There may be one detent, two detents, or three or more detents in camera accessory 56 (as examples).

Figure 14:
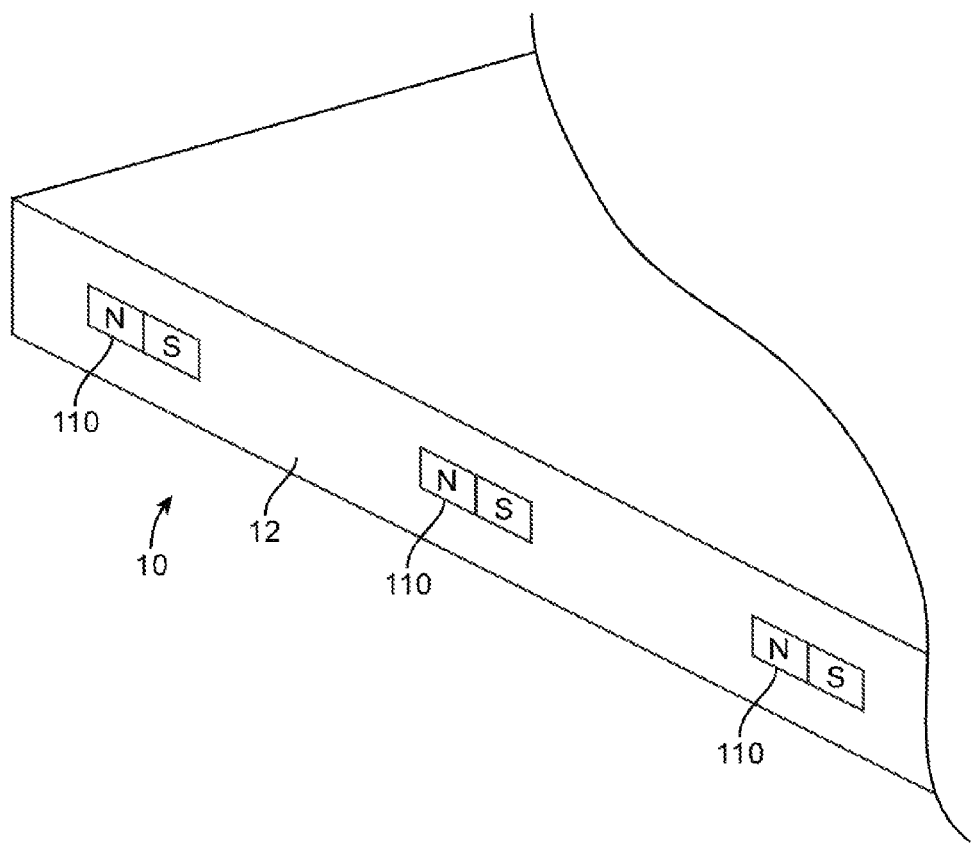
FIG. 14 is a perspective view of an edge of an electronic device with magnets in accordance with an embodiment of the present invention.

It may be desirable to mount electronic device 10 in a stand, to hang electronic device 10 from a support, or to otherwise mount electronic device 10 with support structures. As an example, it may be desirable to attach device 10 to a support arm or other support structure with magnets. FIG. 14 shows how device 10 may be provided with magnetic structures such as magnets 110 along one or more of the edges of housing 12. Magnets 100 may have north poles N and south poles S that are oriented in parallel or in other suitable patterns.

Figure 15:
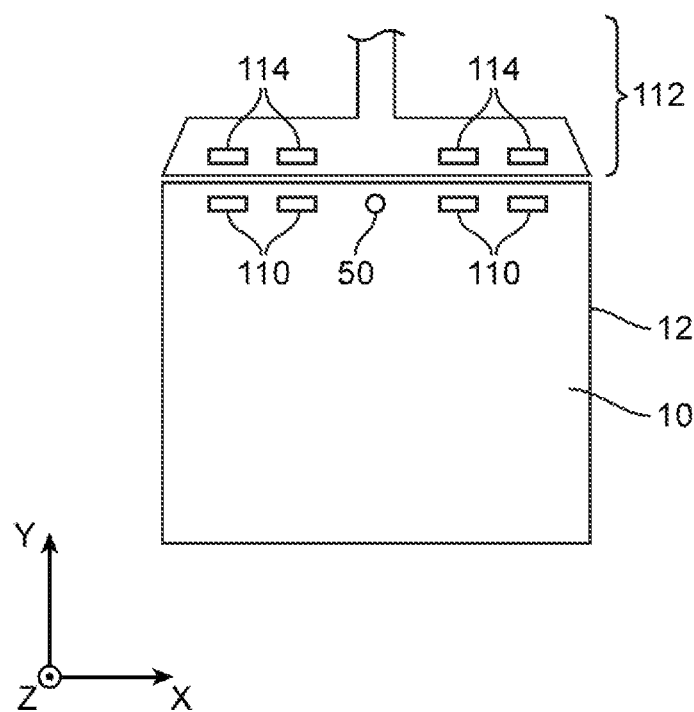
FIG. 15 is a diagram of an electronic device with magnets that has been attached to a support structure with a support arm in accordance with an embodiment of the present invention.

FIG. 15 shows how a support structure such as support structure 112 may have magnetic structures such as magnets 114 that are configured to mate with magnetic structures 110. Magnets 114 may have north and south poles that are configured to mate with the poles of magnets 110. If desired, magnetic structures for accessory 56, support structures 112, or device 10 may be formed using ferromagnetic material that mates with a corresponding magnet.

Figure 16:
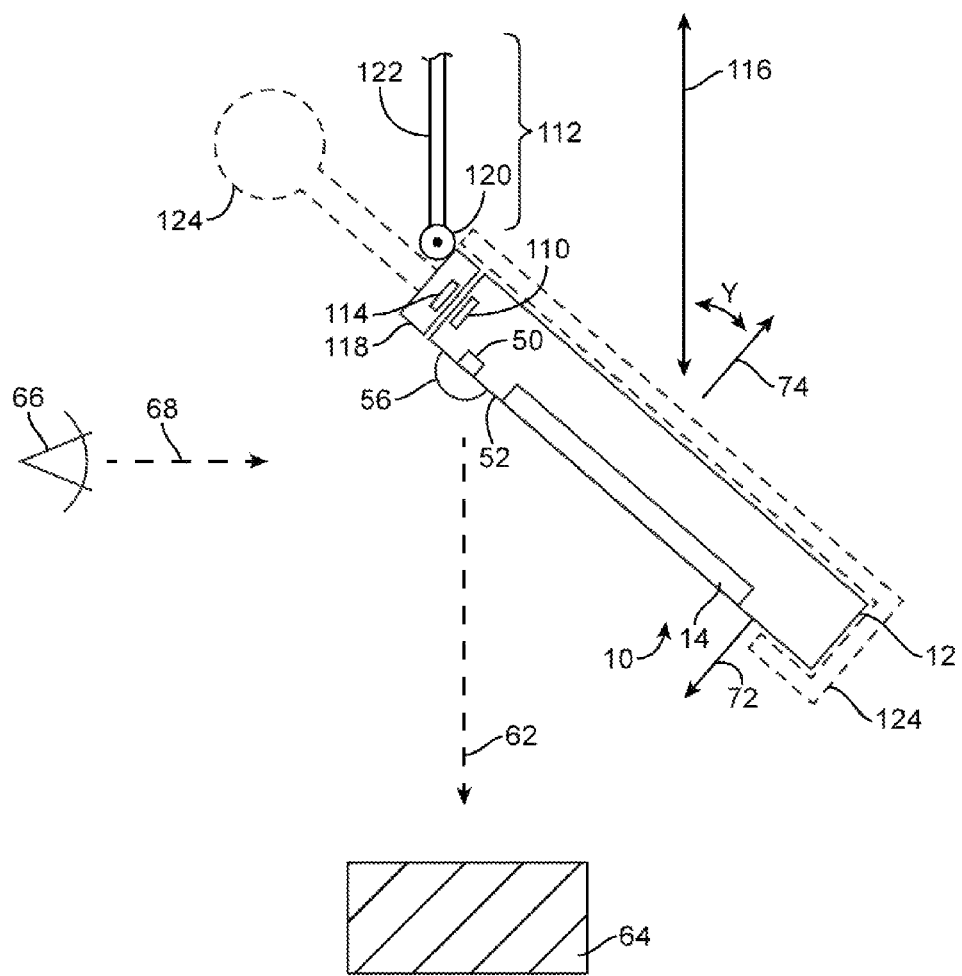
FIG. 16 is a cross-sectional side view of a system with an electronic device that has been mounted to a support structure so that a camera accessory that has been mounted to the electronic device can point a camera in the device in a desired off-axis direction in accordance with an embodiment of the present invention.

It may be desirable to mount device 10 so that device 10 is maintained in a non-vertical position. As shown in FIG. 16, device 10 may, as an example, be maintained in a position in which the plane of device 10 has a surface normal such as surface normal 74 that is angled by an angle Y (e.g., 0-90° or 30-60°) with respect to vertical dimension 116, so that viewer 66 may view display 14 in direction 68. Camera accessory 56 may be mounted over camera 50 so that camera 50 points in direction 62 to capture images of subjects such as object 64.

Support structures 112 may include a support member such as support member 122. Support member 112 may be a bracket that is attached to a wall, cabinet or shelf, an arm that is part of a stand or other support system, or may be other support structures for supporting device 10 in a desired position. Support structures 112 may include support member 118. Support member 118 may include magnetic structures 114 that are coupled with respective magnetic structures 110 in device 10. An optional hinge, ball joint, or other adjustable coupler such as coupler 120 may be used to allow support structure 118 to rotate relative to support structure 122.

When a user adjusts the position of device 10 relative to member 122, member 118 may rotate with device 10 and housing 12, thereby ensuring that magnetic structures 114 and magnetic structures 110 rotate together and remain coupled. If desired, device 10 may be attached to support structures 112 using mechanical attachment mechanisms (in addition to or instead of relying on magnetic attachment mechanisms). As an example, support structure enclosure 124 may be attached to member 118. Device 10 may be held in place by the walls of support structure enclosure 124, thereby reducing or eliminating the need to use magnetic coupling structures 114. Optional counterweight 124 may be used to help balance device 10 with respect to joint 120.

Figure 17:
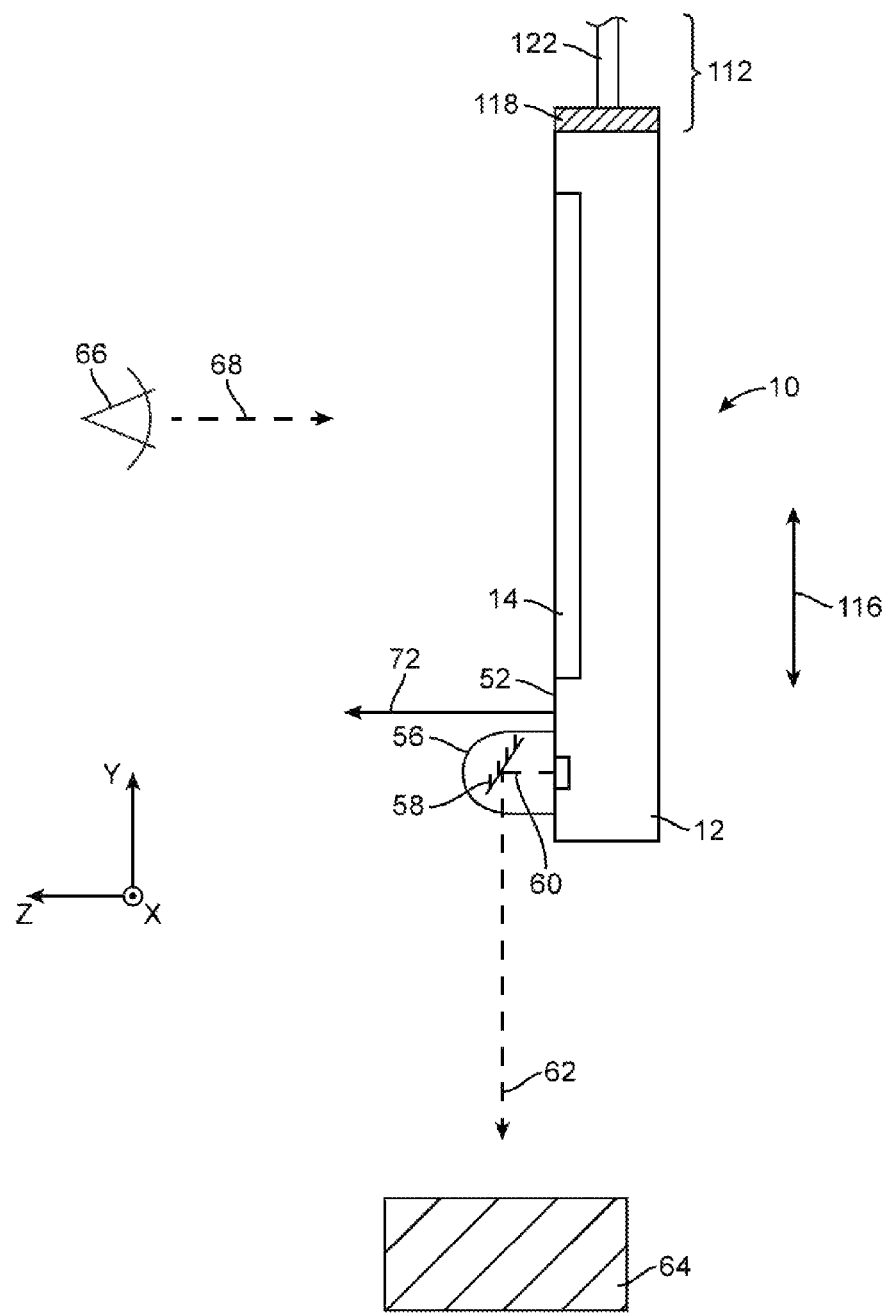
FIG. 17 is a cross-sectional side view of an electronic device in a system with a downwardly pointing camera accessory in accordance with an embodiment of the present invention.

FIG. 17 shows how support structures 112 may be used to hold device 10 in a vertical position in which the plane of device 10 is parallel to vertical dimension 116. In this type of configuration, camera accessory 56 may be used to point camera 50 in direction 62, perpendicular to surface normal 72 of front surface 52 and perpendicular to the plane of device 10 (i.e., the X-Y plane of FIG. 17).

Figure 18:
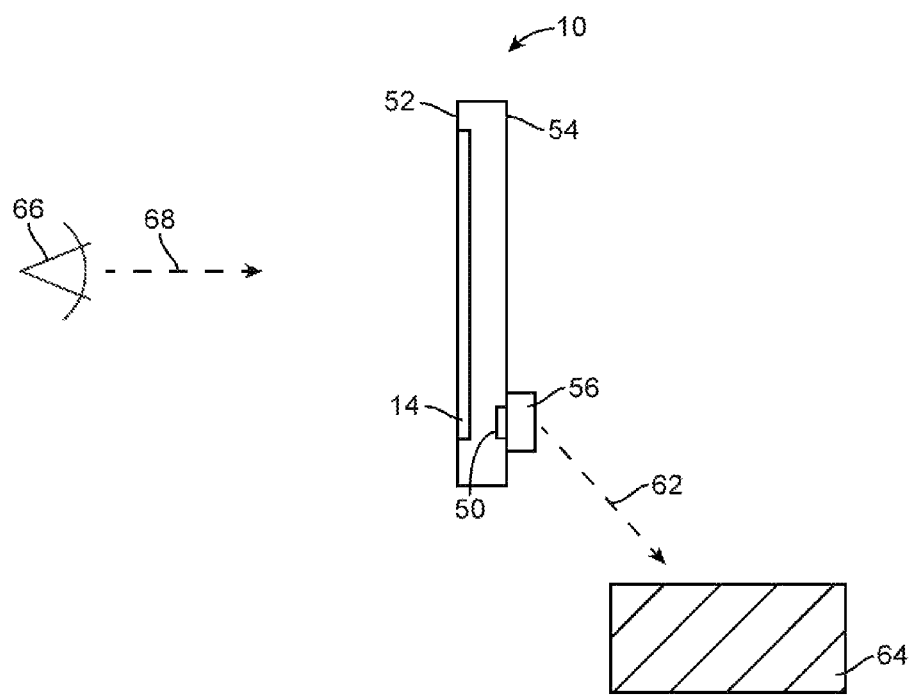
FIG. 18 is a cross-sectional side view of an electronic device in a system in which the electronic device has a camera accessory mounted to a rear-facing camera in accordance with an embodiment of the present invention.

If desired, camera accessory 56 may be mounted on a rear-facing camera such as camera 50 of FIG. 18. With this type of arrangement, camera accessory 56 may point camera 50 downwards in direction 62 towards an object to the rear of device 10 such as object 64 while viewer 66 views display 14 on front face 52 of device 10.

Figure 19:
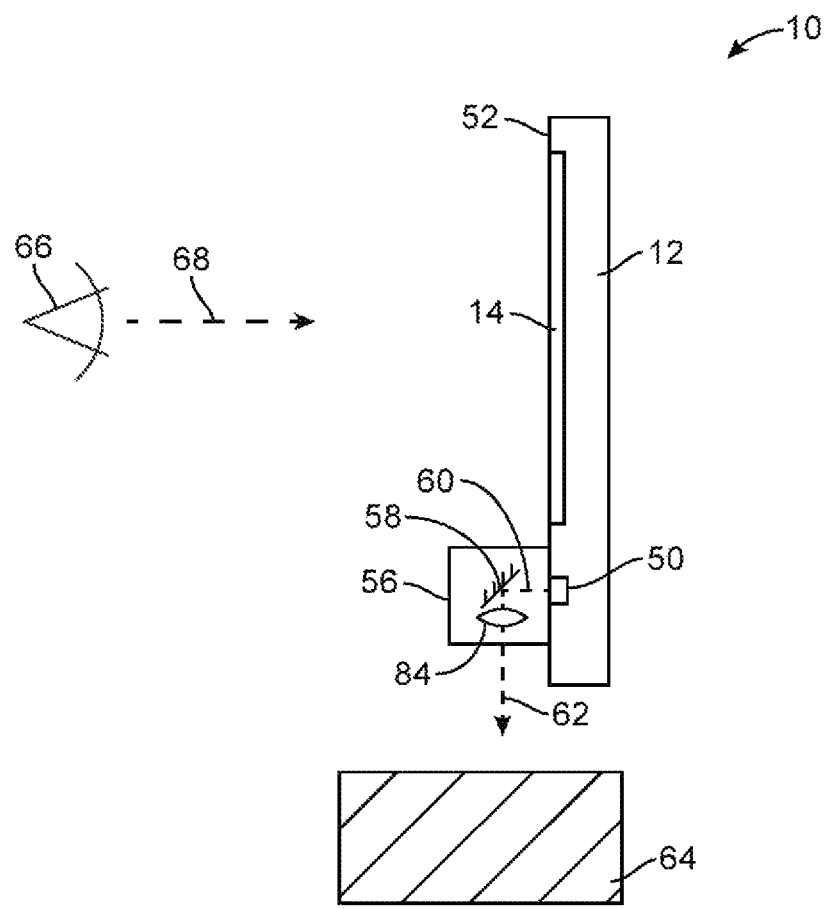
FIG. 19 is a cross-sectional side view of an electronic device that has been provided with a magnifying downwardly pointing camera accessory in accordance with an embodiment of the present invention.

As shown in FIG. 19, camera accessory 56 may be provided with optical structures such a lenses 84 that magnify subjects such as object 64. Object 64 may be, for example, an item that contains printed text. By using magnifying optical structures in camera accessory 56, the images of object 64 that are displayed on display 14 may be enlarged and easier to read for a viewer with impaired vision. If desired, control circuitry 29 may digitally magnify images in addition to using optical structures such as lenses 84 to magnify image light received by camera 50.

Figure 20:
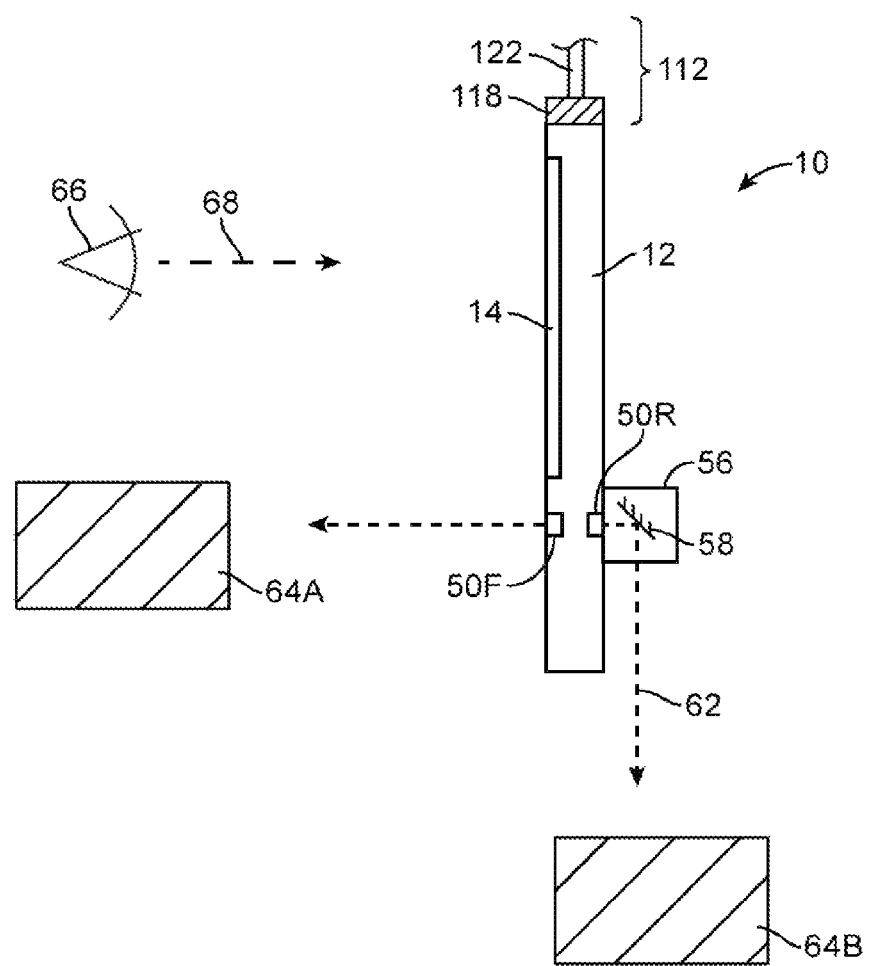
FIG. 20 is a cross-sectional side view of an electronic device that has a downwardly pointing camera accessory and is simultaneously using front and rear cameras in accordance with an embodiment of the present invention.

FIG. 20 is a diagram of a system in which device 10 is simultaneously using a front-facing camera such as camera 50F and a rear-facing camera such as camera 50R. Cameras 50F and 50R may be used to capture images of different objects. One or more camera accessories may be provided to modify the directions in which cameras 50F and 50R are pointing. In the example of FIG. 20, front-facing camera 50F does not have a camera accessory and therefore points on-axis at object 64A. Rear-facing camera 50R is covered with camera accessory 56, so rear-facing camera 50R points in off-axis direction 62 at object 64B. A viewer such as viewer 66 may view display 14 in direction 68.

With one suitable arrangement, object 64A may be associated with viewer 66. For example, object 64A may be the face of viewer 66 or another person. Object 64B may be associated with the hands of a person (e.g., viewer 66 or another person). Other subjects may be imaged using the configuration of FIG. 20 if desired. The use of device 10 in FIG. 20 to simultaneously gather digital image data for subjects such as a person's face or hands is merely illustrative.

Figure 21:
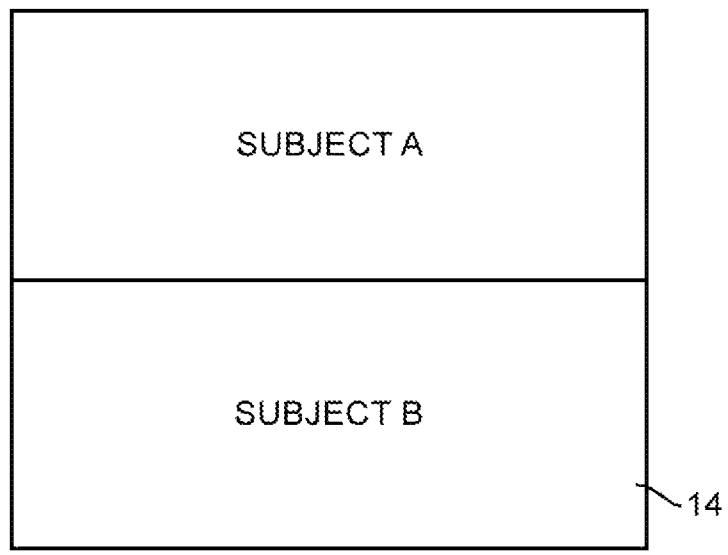
FIG. 21 is a diagram of a display that is being used to present a user with content using an illustrative split-screen format in accordance with an embodiment of the present invention.

Control circuitry 29 of device 10 may display image data such as the image data captured simultaneously using front-facing camera 50F and rear-facing camera 50R (and camera accessory 56) using a split-screen layout or other layout that can accommodate multiple simultaneous images. An illustrative split-screen format for displaying content acquired using cameras such as cameras 50F and 50R of FIG. 20 is shown in FIG. 21. The portion of display screen 14 labeled "subject A" may be used for displaying images of object 64A that were acquired using camera 50F. The portion of the screen labeled "subject B" may be used for displaying images of object 64B that were acquired using camera 50R.

Figure 22:
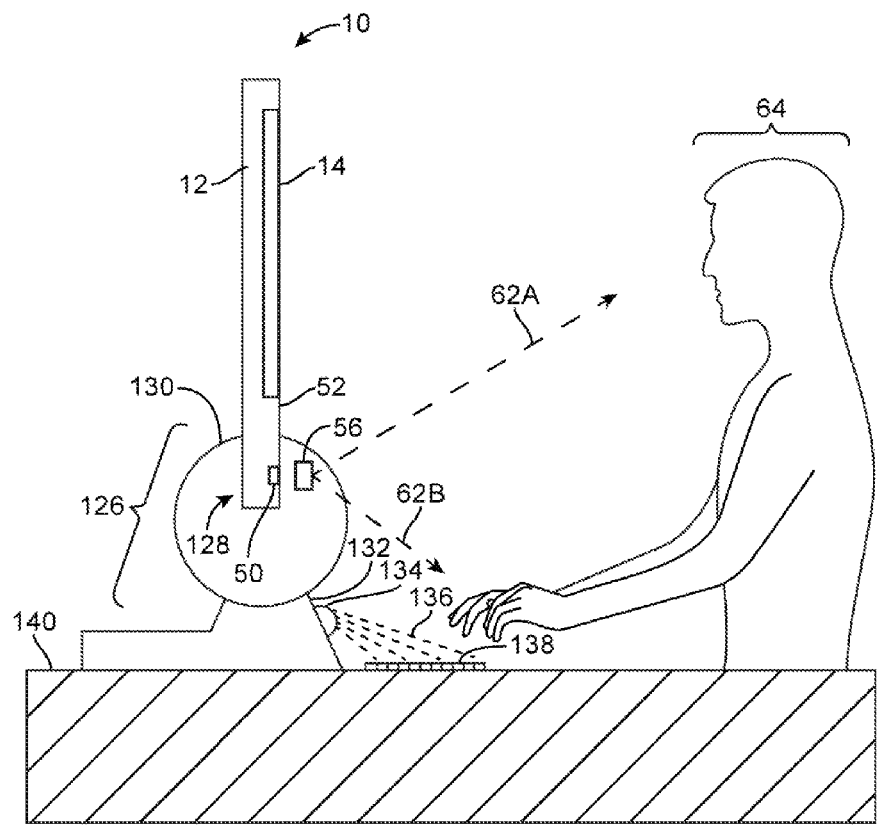
FIG. 22 is a diagram of a system that has a camera accessory implemented as part of a stand in accordance with an embodiment of the present invention.

As shown in the illustrative system of FIG. 22, device 10 may be supported using support structures such as device stand 126. Device stand 126 may have a portion such as portion 132 that rests on surface 140 and a portion such as portion 130 with features such as recess 128 for receiving and supporting device 10. Camera accessory structures (e.g., one or more reflectors 58, lenses 84, etc.) may be embedded within stand structures 130. The optical structures of accessory 56 may be used to point camera 50 in direction 62A (e.g., to image a user's face or other portion of subject 64) or may be used to point camera 50 in direction 62B (e.g., to image a user's hands or other subject 64). Using a pair of reflectors 58, camera accessory structures 56 may be used to point part of the field of view of camera 50 in direction 62A while simultaneously pointing a remaining part of the field of view of camera 50 in direction 62B.

As shown in FIG. 22, stand 126 may include additional components such as component 134. Component 134 may provide illumination for a user, may include a projector for projecting images, and may include a camera or other sensor for detecting user input (e.g., from a user's fingers). Using this equipment, component 134 can implement a virtual keyboard such as keyboard 138, as illustrated by projected light 136 from component 134. Stand 126 may also incorporate power supply circuitry for powering device 10 and other components.

Figure 23:
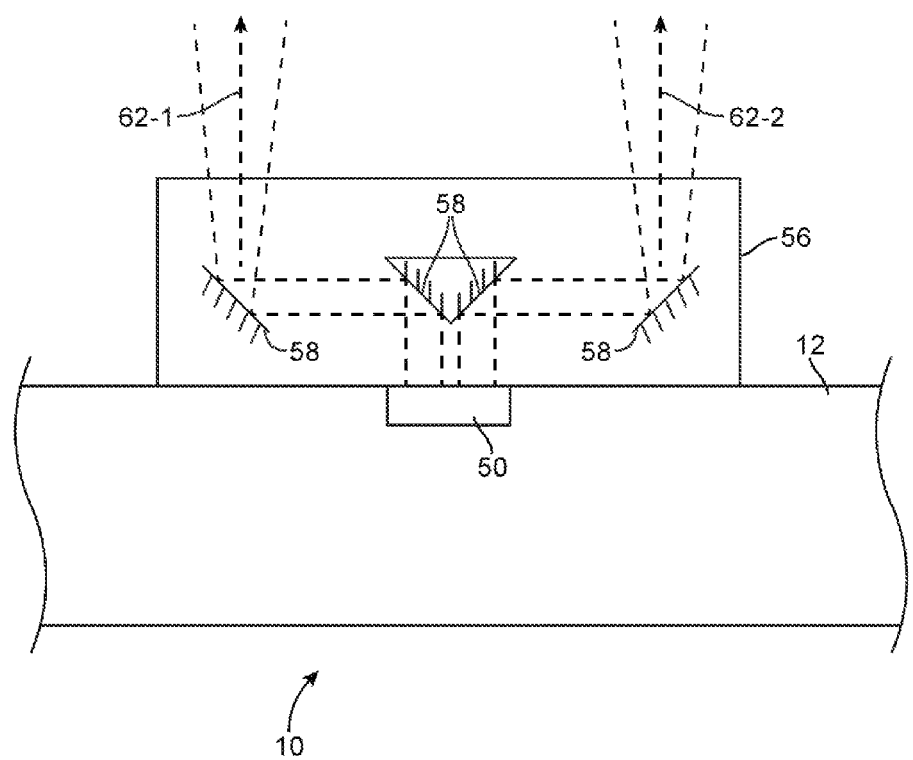
FIG. 23 is a cross-sectional view of an illustrative three-dimensional imaging camera accessory mounted over a camera in an electronic device in accordance with an embodiment of the present invention.

A camera accessory such as camera accessory 56 of FIG. 23 may be provided with reflector structures 58 that split the field of view of camera 50 into multiple paths such as paths 62-1 and 62-2. This may allow camera accessory 56 to provide camera 50 and device 10 with the ability to capture three-dimensional images. During operation, the image data associated with paths 62-1 and 62-2 may be processed by control circuitry 29 to display three-dimensional images on display 14 (e.g., by coloring different portions of the image with different colors for viewing through colored glasses, using polarization-based systems, etc.).

Figure 24:
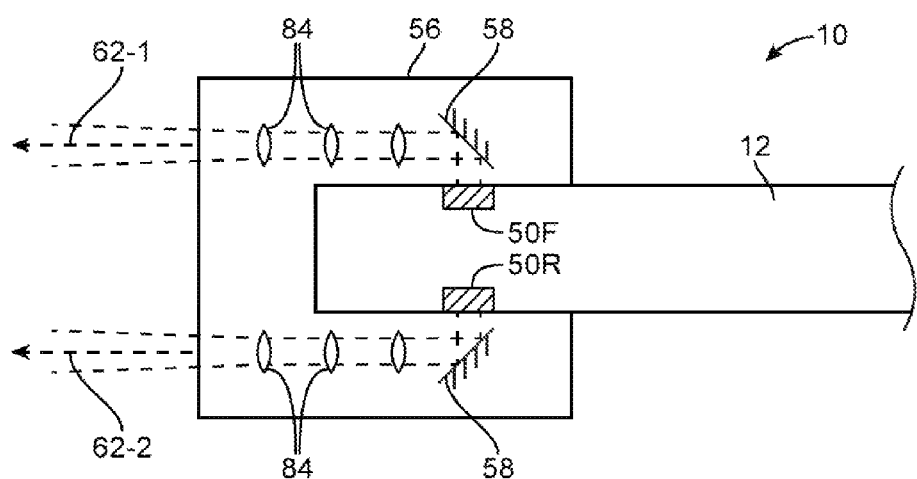
FIG. 24 is a diagram of an illustrative system in which a mechanical attachment scheme such as a clamp-based scheme is being used to attach a camera accessory with three-dimensional imaging capabilities to both rear-facing and front-facing cameras in accordance with an embodiment of the present invention.

In the illustrative configuration of FIG. 24, camera accessory 56 includes reflective structures 58 and optional lenses 84 that allow camera accessory 56 to point front-facing camera 50F in direction 62-1 while simultaneously pointing rear-facing camera 50R in direction 62-2. Camera accessory 56 may be attached to electronic device 10 using a friction fit, suction cups, removable adhesive, magnets, or other suitable attachment schemes, as described in connection with camera accessories of other configurations. Camera accessory 56 may be used to acquire images from two different vantage points so that control circuitry 29 can form three-dimensional images.

Figure 25:
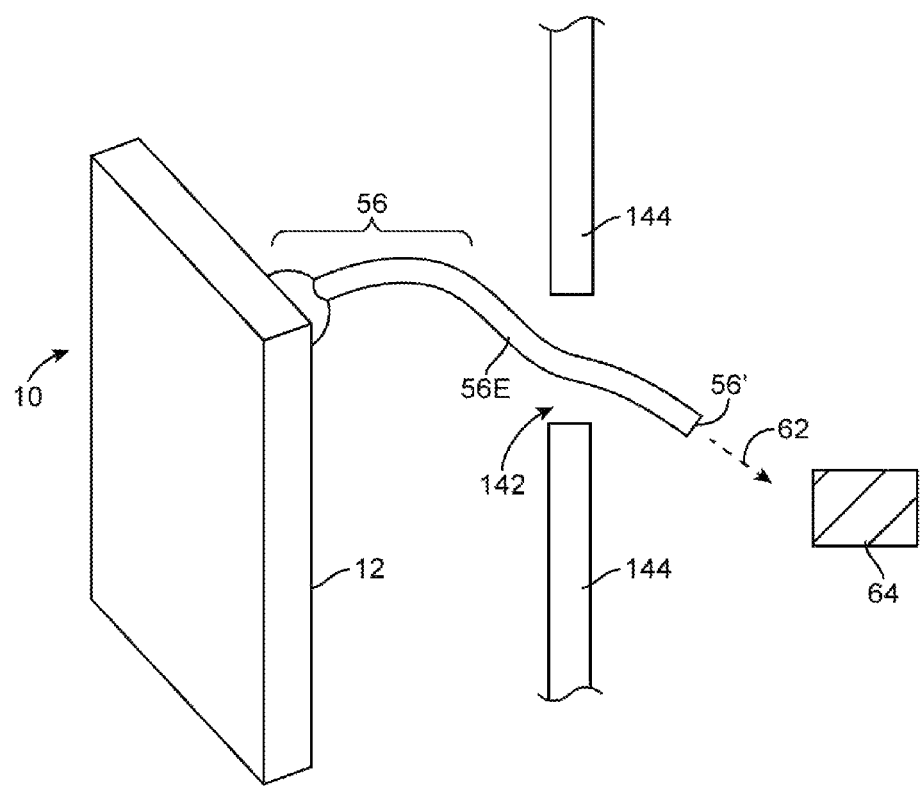
FIG. 25 is a diagram showing how an electronic device may be provided with a camera accessory with an elongated shaft for acquiring image content in hard-to-reach places in accordance with an embodiment of the present invention.

A camera accessory may, if desired, be provided with an elongated shaft such as shaft 56E of FIG. 25. Shaft 56E of FIG. 25 may be flexible or rigid. Optical fibers or other optical structures within shaft 56E may allow images that are captured at exit 56' of shaft 56E to be conveyed to camera 50. Because shaft 56E may be long and thin, shaft 56E may fit through openings such as opening 142 in obstructions such as obstruction 144 to capture image data for hidden objects such as object 64.

Figure 26:
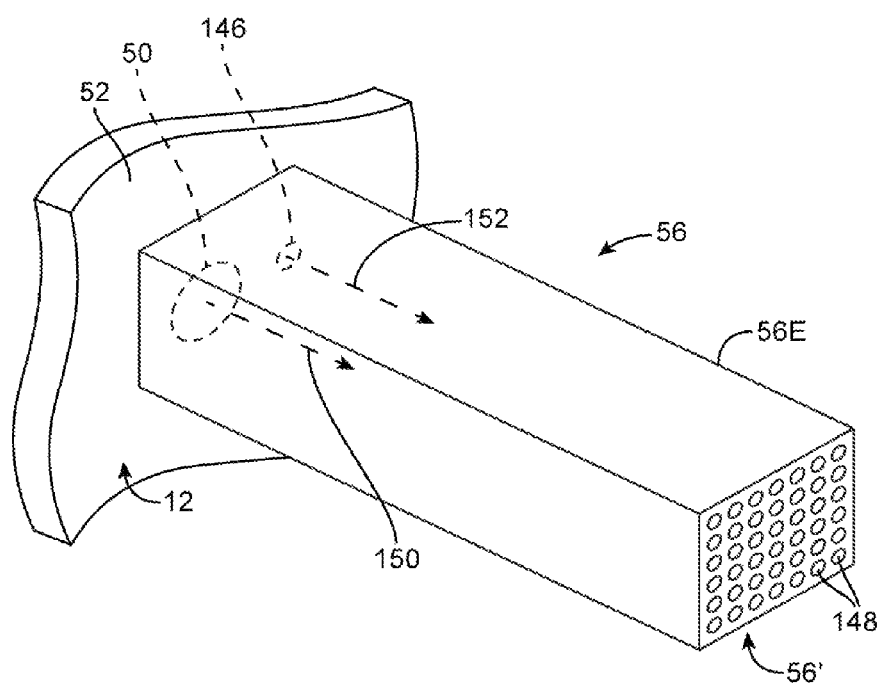
FIG. 26 is a perspective view of an illustrative fiber-bundle structure of the type that may be used in the elongated shaft of FIG. 25 in accordance with an embodiment of the present invention.

FIG. 26 is a perspective view of camera accessory 56 of FIG. 25 showing how shaft 56E may contain a bundle of optical fibers 148. Fibers 148 may extend from shaft exit 56' to surface 52 of housing 12. As shown in FIG. 26, camera 50 may be provided with an associated light source such as light source 146. Light source 146 may be a light-emitting diode of the type that is used to provide brief illumination of a subject during image capture operations (i.e., light source 146 may serve as a camera flash unit) and/or may provide more prolonged illumination (e.g., when a video clip is being acquired). Light source 146 may emit light in direction 152 while camera 50 is operating in direction 150. Light 152 may be conveyed along the length of shaft to exit 56', where light 152 may be emitted to illuminate objects in the vicinity of exit 56'. Camera 50 may gather images that have been conveyed along shaft 56E by fiber bundle 148. The fiber bundle may take the place of reflector 58 by pointing camera 50 in an off-axis direction (e.g., by orienting exit 56' in a desired direction).

The foregoing is merely illustrative of the principles of this invention and various modifications can be made by those skilled in the art without departing from the scope and spirit of the invention.

What is claimed is:

1. A method, comprising:
   capturing image data with a camera in an electronic device that has a planar surface to which a camera accessory with reflector structures is coupled to reflect light for the camera, wherein the camera has a field of view;
   with support structures, holding the electronic device such that the planar surface extends vertically;
   with a component in the support structures, projecting an image of a virtual keyboard on a surface, wherein the reflector structures comprise a first reflector that points a first portion of the field of view of the camera towards the virtual keyboard and a second reflector that points a second portion of the field of view of the camera towards a face of a user of the virtual keyboard; and
   displaying the image data on a display that is mounted on the planar surface, wherein the first and second reflectors point the camera in respective first and second off-axis directions relative to a surface normal associated with the planar surface, and wherein the first and second off-axis directions are at an angle between 5° and 70° relative to the surface normal associated with the planar surface.

2. The method defined in claim 1 wherein the planar surface comprises a front face of the electronic device, wherein the camera is mounted on the front face of the electronic device, and wherein capturing the image data comprises using the camera mounted on the front face of the electronic device and the camera accessory to capture the image data while displaying the image data on the display on the front face of the electronic device.

3. A camera accessory configured to be mounted over first and second cameras in an electronic device having an electronic device housing, wherein the electronic device housing has first and second opposing sides, the camera accessory comprising:
   a camera accessory housing;
   a first reflector in the camera accessory housing that is configured to reflect light for the first camera to point a portion of a field of view of the first camera in a first off-axis direction;
   a second reflector in the camera accessory housing that is configured to reflect light for the second camera to point a portion of a field of view of the second camera in a second off-axis direction; and
   structures that are configured to attach the camera accessory to the electronic device housing, wherein the first camera is on the first side of the electronic device housing and the second camera is on the second side of the electronic device housing, wherein the first reflector overlaps the first camera, and wherein the second reflector overlaps the second camera.

4. The camera accessory defined in claim 3 wherein the structures comprises magnetic structures.

5. The camera accessory defined in claim 3 wherein the camera accessory housing has rotational detents.

6. The camera accessory defined in claim 3 further comprising first and second transparent windows, wherein the first transparent window in the camera accessory housing overlaps the first camera.

7. The camera accessory defined in claim 3 wherein the structures comprise clamp structures.

8. The camera accessory defined in claim 3 wherein the structures comprise elastomeric structures.

9. The camera accessory defined in claim 3 wherein the structures comprise reusable adhesive.

10. The camera accessory defined in claim 3, wherein the camera accessory housing has a first portion that is in direct contact with the first side of the electronic device housing when the camera accessory is attached to the electronic device housing, and wherein the camera accessory housing has a second portion that is in direct contact with the second side of the electronic device housing when the camera accessory is attached to the electronic device housing.

* * * * *